(12) United States Patent
Yang et al.

(10) Patent No.: US 7,848,919 B2
(45) Date of Patent: Dec. 7, 2010

(54) METHOD AND SYSTEM OF EDITING A LANGUAGE COMMUNICATION SHEET

(75) Inventors: Kuo-Ping Yang, 4th Fl., No. 18-1, Section 3, Red Ai Rd., Taipei (TW) Taipei 106; Chao-Jen Huang, Taipei (TW); Chih-Long Chang, Taipei (TW); Chien-Liang Chiang, Taipei (TW)

(73) Assignee: Kuo-Ping Yang, Taipei (TW)

( * ) Notice: Subject to any disclaimer, the term of this patent is extended or adjusted under 35 U.S.C. 154(b) by 1238 days.

(21) Appl. No.: 11/435,858

(22) Filed: May 18, 2006

(65) Prior Publication Data

US 2007/0088538 A1  Apr. 19, 2007

(30) Foreign Application Priority Data

Oct. 19, 2005  (TW)  ................. 94136570 A

(51) Int. Cl.
*G06F 17/21* (2006.01)
*G06F 17/28* (2006.01)
*G09B 19/00* (2006.01)
*G09B 19/06* (2006.01)

(52) U.S. Cl. ................. 704/10; 704/2; 704/4; 434/156; 434/157; 434/171; 434/176

(58) Field of Classification Search ............... 704/1–10; 434/156–185
See application file for complete search history.

(56) References Cited

U.S. PATENT DOCUMENTS

| | | | |
|---|---|---|---|
| 5,978,648 A * | 11/1999 | George et al. | 434/362 |
| 6,146,146 A * | 11/2000 | Koby-Olson | 434/159 |
| 6,305,942 B1 * | 10/2001 | Block et al. | 434/156 |
| 7,149,690 B2 * | 12/2006 | August et al. | 704/270 |
| 7,150,630 B2 * | 12/2006 | Budra et al. | 434/169 |
| 2001/0034016 A1 * | 10/2001 | Ziv-el et al. | 434/350 |
| 2001/0041330 A1 * | 11/2001 | Brown et al. | 434/332 |
| 2002/0115044 A1 * | 8/2002 | Shpiro | 434/156 |
| 2003/0108854 A1 * | 6/2003 | Chan | 434/317 |
| 2003/0208353 A1 * | 11/2003 | Ueda | 704/4 |
| 2004/0034523 A1 * | 2/2004 | Han | 704/8 |
| 2004/0215446 A1 * | 10/2004 | Nakano | 704/9 |
| 2005/0112531 A1 * | 5/2005 | Maldonado et al. | 434/157 |

OTHER PUBLICATIONS

The Oxford Picture Dictionary Interactive, A CD-ROM with interactive dictionary computer program, published by Oxford University Press, 2000.*
"Picture Dictionary", [Online] published on http://classes.yale.edu, Retrieved from "www.archive.org", archive date: May 27, 2005.*

* cited by examiner

*Primary Examiner*—James S Wozniak
*Assistant Examiner*—Jialong He
(74) *Attorney, Agent, or Firm*—Bacon & Thomas, PLLC

(57) ABSTRACT

A method of editing communication sheets comprises providing a picture/text editing interface; providing a dividing function for communication sheet; providing a expression (s) database, a picture database and a voice database; providing a correlation searching function; providing expression (s) insertion function; providing picture insertion function; providing language assigning function; and providing a output file generating function. The method also handles multiple languages and can change the language of expression (s) or voice with a rapid manner.

15 Claims, 17 Drawing Sheets

31

| correlation indices 311 | Chinese 312 | English 313 |
|---|---|---|
| 001234 | 蘋果 | Apple |
| . . . | . . . | . . . |
| 002345 | 漢堡 | Hamburger |
| . . . | . . . | . . . |
| 011234 | 相機 | Camera |
| . . . | . . . | . . . |
| 017890 | 電話 | Telephone |
| . . . | . . . | . . . |
| . . . | . . . | . . . |

261

Cell-1, 0,0,10,10,apple, 001234.jpg, 001234.wav
Cell-2, 10,0,20,10,Camera, 011234.jpg, 011234.wav
Cell-3, 0,10,10,20,Hamburger, 002345.jpg, 002345.wav
Cell-4, 10,10,20,20,Telephone, 017890.jpg, 017890.wav

METHOD AND SYSTEM OF EDITING A LANGUAGE COMMUNICATION SHEET

BACKGROUND OF THE INVENTION

1. Field of the Invention

The present invention relates to a method and related system of editing a language communication sheet.

2. Description of the Related Art

Language communication sheets are usually displayed on a computer screen or a communication sheet device (such as the device disclosed in U.S. Pat. No. 6,369,721, entitled "Input Device with Page Turning Function). The language communication sheet usually comprises a plurality of language communication units, and each language communication unit comprises at least one picture (such as a picture of an apple) and a vocabulary expression (such as "apple") that corresponds to the picture. When a user clicks or touches on one of the language communication units, a vocalization corresponding to the expression is played.

This picture, text and vocalization communication method can be used for people having speech impediment or for different language communication.

Usually, a large amount of time is required to produce the language communication sheet; for example, Power Point may be used to create the language communication sheet, and this suffers from the following drawbacks:

a. the vocalization must be recorded manually;

b. the language communication units must be distributed;

c. in the language communication unit, the pictures, expressions and vocalizations must all be separately inserted into the language communication unit.

d. in order to change the language of the expressions and vocalizations in each language communication unit, each language communication unit must be changed individually.

Therefore, it is desirable to provide a method and related system of editing a language communication sheet to mitigate and/or obviate the aforementioned problems.

SUMMARY OF THE INVENTION

A main objective of the present invention is to provide a method of editing a language communication sheet in a rapid way, so the user can insert pictures, expressions and vocalizations in the language communication unit of the language communication sheet in one operation.

Another objective of the present invention is to provide a language communication sheet with multiple languages editing functionality.

Another objective of the present invention is to provide a method of changing the expressions or the vocalizations in all language communication units into another language in one operation.

In order to achieve the above-mentioned, the method of editing a language communication sheet of the present invention comprises:

providing a picture/text editing interface, wherein the picture/text editing interface has a picture/text editing area and a function key area;

providing a dividing function for a communication sheet to divide the picture/text editing area into a plurality of language communication units;

providing an expression database, the expression database comprising a plurality of expression, wherein the expressions comprise more than one language expressions, and have a correlation of plurality of expressions that have identical meaning individually from different language;

providing a picture database, the picture database comprising a plurality of pictures, wherein at least one of the pictures is correlated with one expression of the expression database;

providing a vocalization database, the vocalization database comprising a plurality of vocalizations corresponding to the plurality of expressions, wherein the vocalizations comprise plurality of vocalizations, and plurality of vocalizations individually from different languages having identical meanings are correlated, wherein at least one of the vocalizations is correlated with one expression of the expression database;

providing a correlation searching function, wherein the correlation searching function is capable of finding a picture for an expression according to correlations between the vocalizations and the pictures; and providing an expression insertion function capable of inserting an expression into any one of the language communication units;

providing a picture insertion function capable of inserting a picture into any one of the language communication units;

providing a language assigning function, wherein the language assigning function is capable of assigning expressions in all language communication units as expressions of the first language or expressions of the second language; and providing an output file generation function to generate an output file, wherein the output file comprises:

a position of each language communication unit;

an expression inserted into each language communication unit;

a picture inserted into each language communication unit; and a vocalization corresponding to the expression inserted into each language communication unit.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
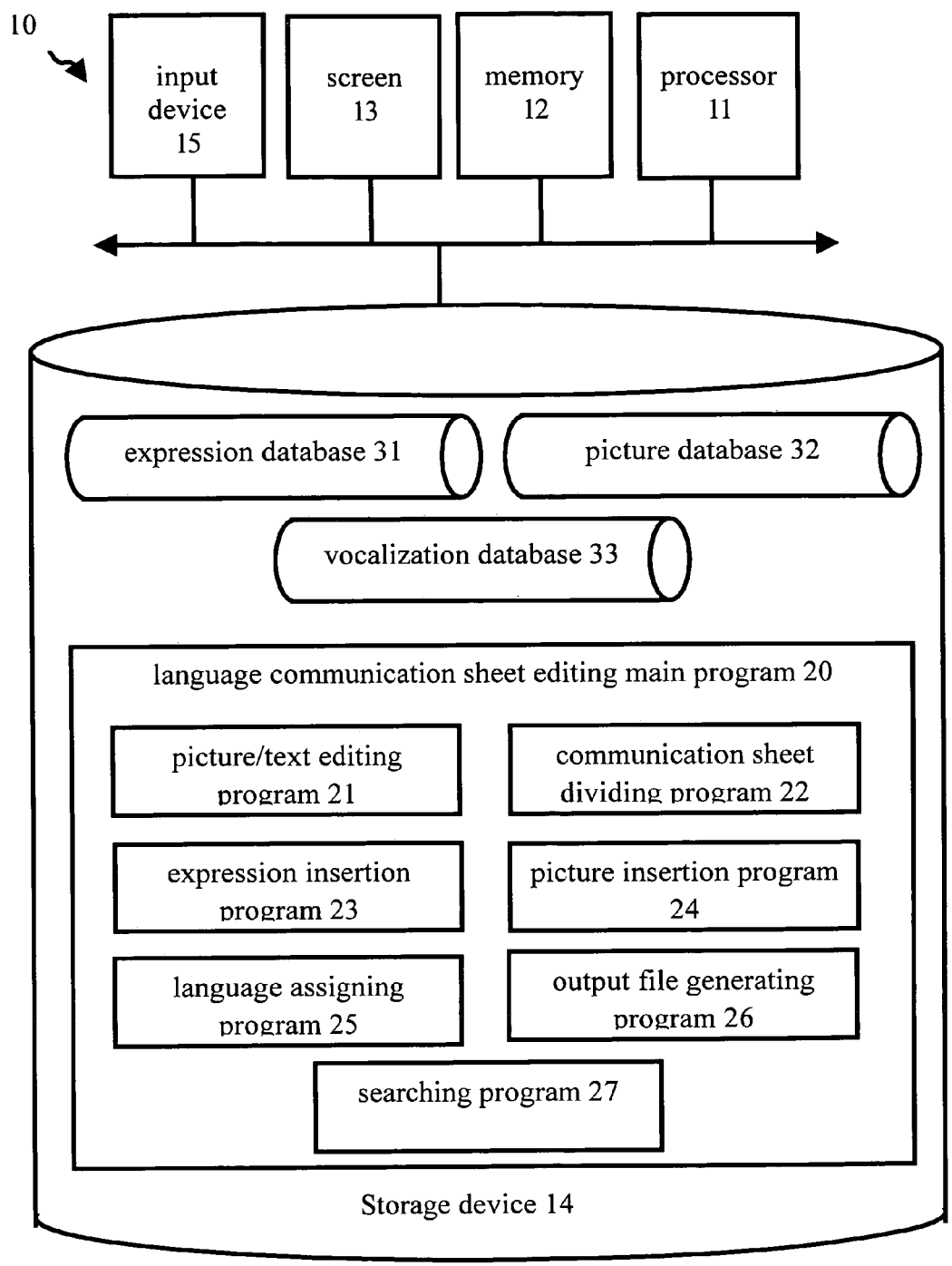
FIG. 1 is a hardware structure drawing of the present invention.

Please refer to FIG. 1, which shows a hardware structure drawing of an editing system for language communication sheets 10. The editing system for language communication sheet 10 comprises a processor 11, a memory 12, a screen 13, a storage device 14 and an input device 15 (such as a keyboard or a mouse); the editing system for language communication sheets 10 may therefore be implemented on a typical personal computer.

A characteristic of the present invention is that the storage device 14 comprises a language communication sheet editing main program 20, a expression database 31, a picture database 32 and a vocalization database 33. The language communication sheet editing main program 20 comprises a picture/text editing program 21, a communication sheet dividing program 22, an expression insertion program 23, a picture insertion program 24, a language assigning program 25, an output file generating program 26 and a searching program 27. More detail about the programs and the databases are provided in the following flowchart and discussion thereof.

Figure 2:
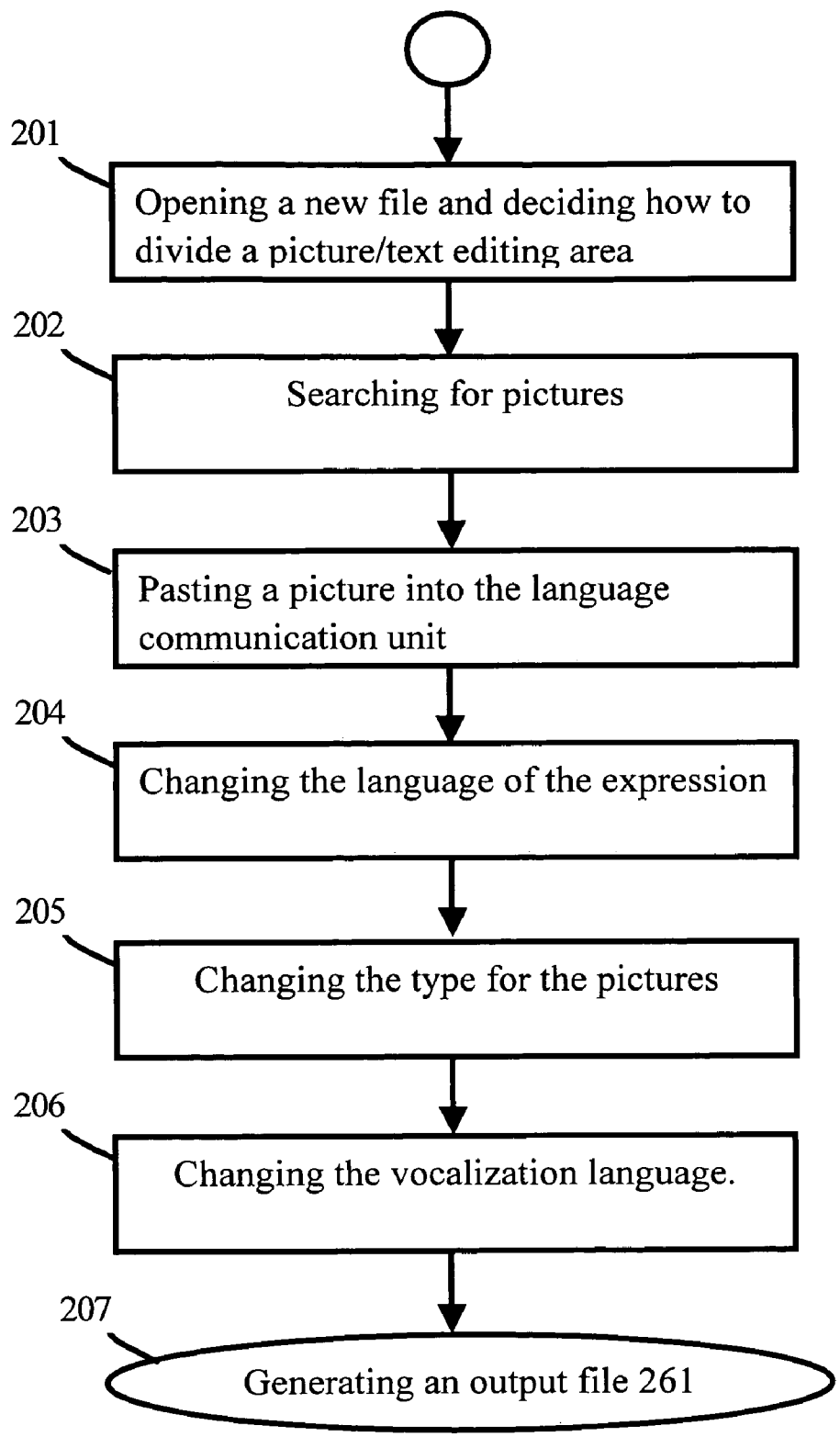
FIG. 2 is a flowchart of an embodiment of the present invention.

Please refer to FIG. 2. FIG. 2 is a flowchart of an embodiment of the present invention. Please also refer to FIG. 3 to FIG. 18.

Figure 7:
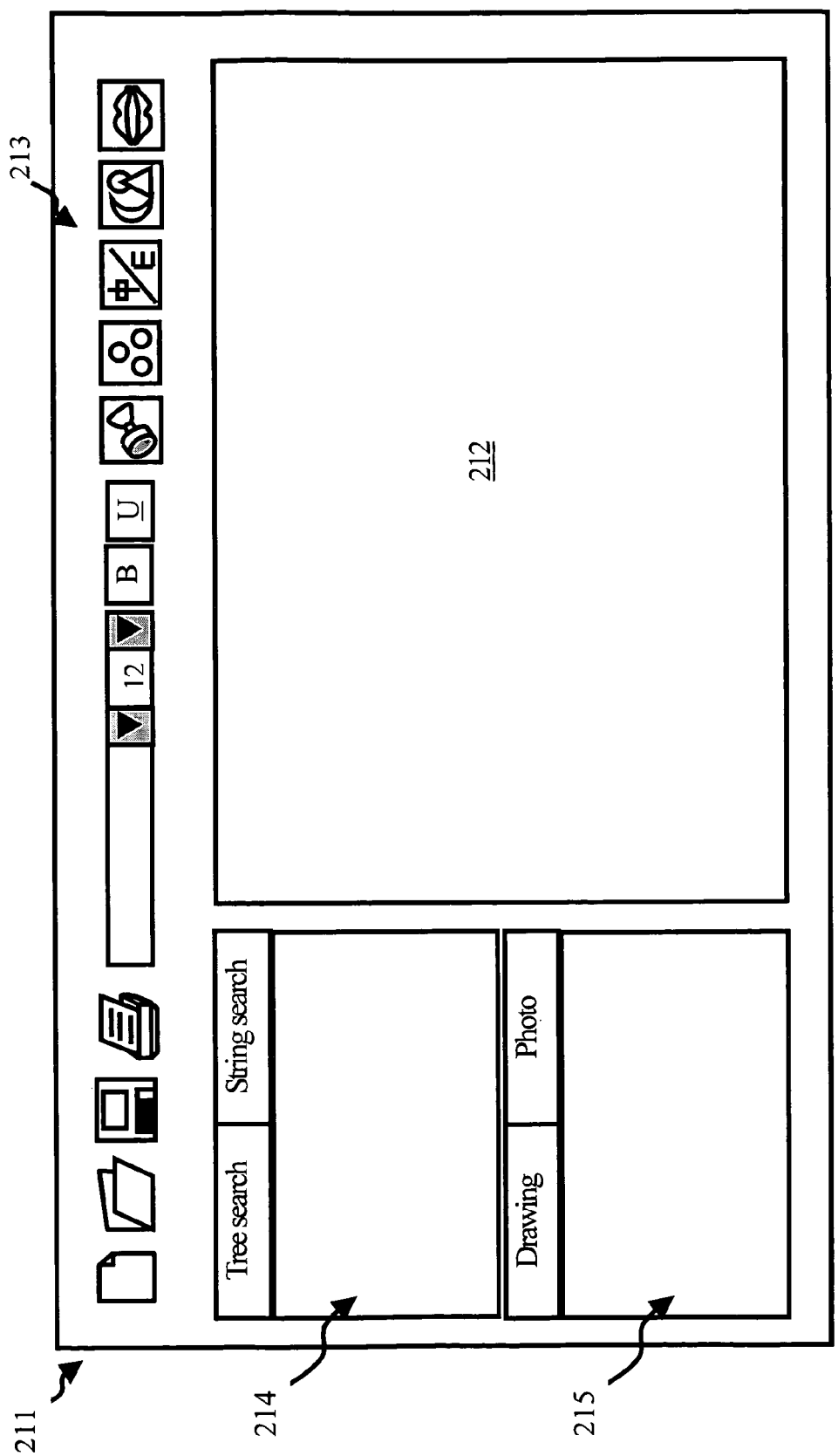
FIG. 7 shows an embodiment of a picture/text editing interface according to the present invention.

Step 201:

Opening a new file and deciding how to divide a picture/text editing area:

Please refer to FIG. 7. The picture/text editing program 21 provides a picture/text editing interface 211 for the user to operate. The picture/text editing interface comprises a picture/text editing area 212, an operating button area 213, a picture searching area 214 and a picture displaying area 215.

Figure 8:
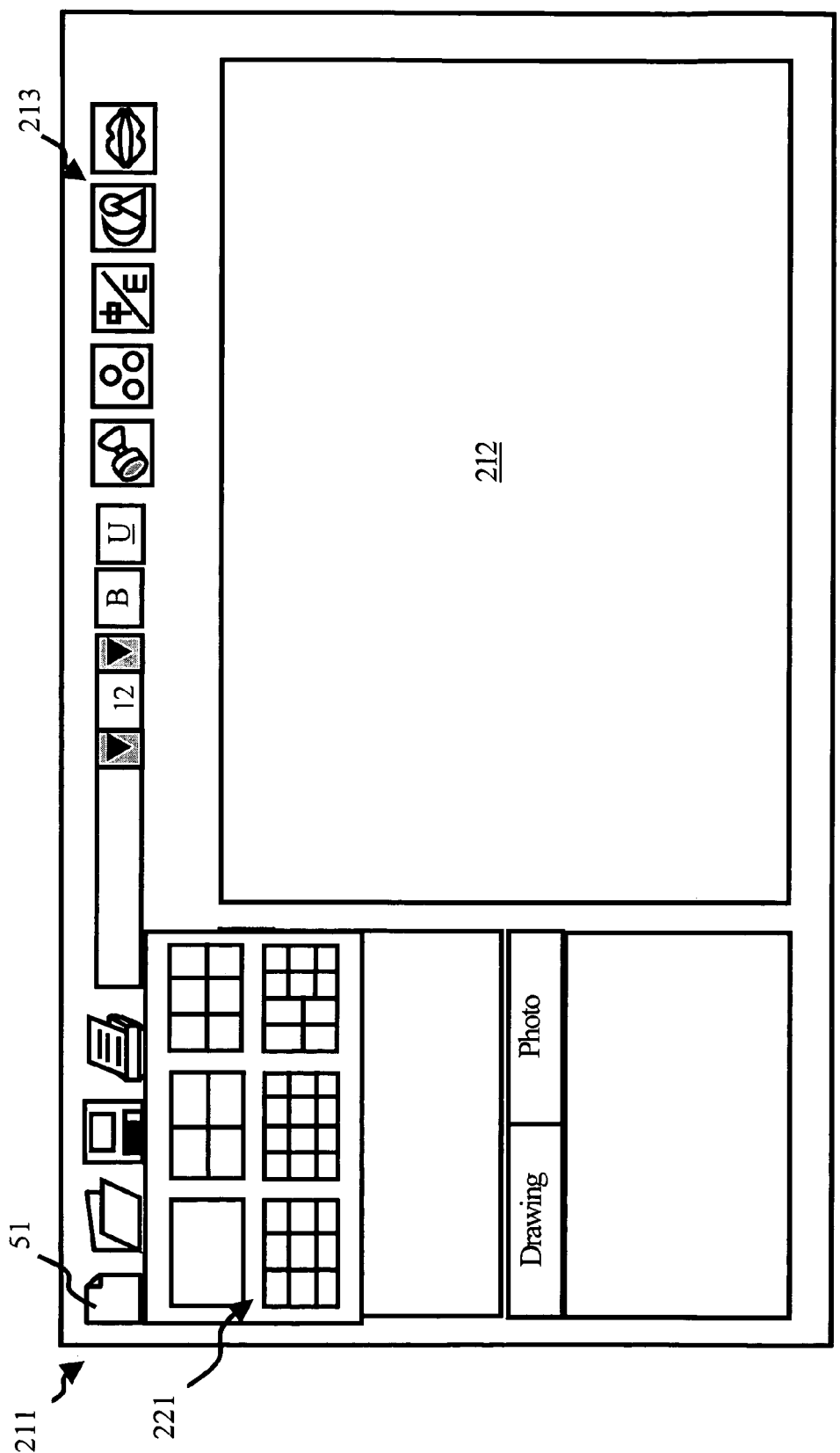
FIGS. 8 to FIG. 17 show situations, with reference of FIG. 2, involving the picture/text editing interface according to the present invention.

Please refer to FIG. 8. The user can press (usually with the mouse) an "open new file" button 51; a dividing selection window 221 pops up, so that the user can select how to divide the picture/text editing area 212. For example, if the user selects a 2×2 division (a division involving two columns and two rows), with reference to FIG. 9, the picture/text editing area 212 is divided into four areas. These smaller divided areas are defined as language communication units; in this embodiment, there are four language communication units 212a, 212b, 212c, 212d.

Figure 9:
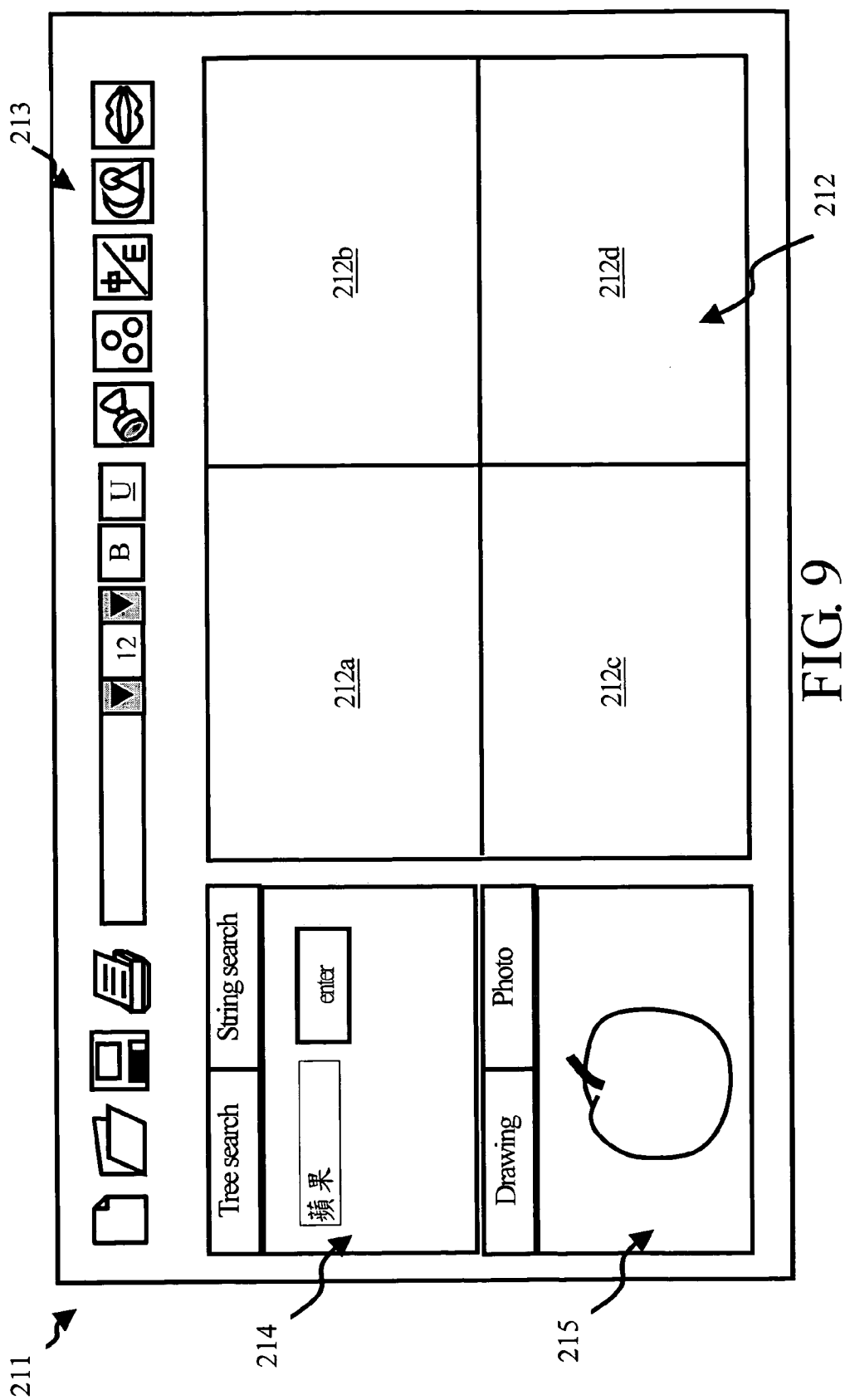

Step 202:

Searching for pictures with the searching program 27:

Please refer to FIG. 9. The picture searching area 214 enables the user to find pictures using a "string search" or "tree search" approach. As shown in FIG. 9, if a "string search" approach is used, when the user inputs "apple" and a picture of "apple" is available, then the picture of "apple" is displayed in the picture displaying area 215.

The "tree search" approach utilizes a search based on related "vocabularies" that have been sorted. For example, hierarchically, "apple" may be an item under a "fruit" sub-category, and the "fruit" sub-category may be under a general "food" category. The "tree search" approach is a well-known technology, and therefore requires no further description.

Basically, the picture searching area 214 is used for inputting one "expression" to obtain the required "picture". The following description explains the expression database 31, the picture database 32 and the vocalization database 33, and how a "picture" corresponding to an "expression" is found.

Figure 3:
FIG. 3 shows an embodiment of an expression database according to the present invention.
Figure 6:
FIG. 6 shows a schematic drawing of an output file according to the present invention.

Please refer to FIG. 3, which shows an embodiment of the expression database 31. In this present invention, the expression database 31 comprises vocabularies for more than one language. In this embodiment, Chinese and English are used as by way of example. The expression database 31 comprises three columns: correlation index 311, Chinese 312 and English 313, and vocabularies with the same meaning but in different languages have the correlation index 311 as a correlation connector. For example, "蘋果" and "Apple" have the same meaning but in different languages, so "蘋果" and "Apple" correspond to the same correlation index: "001234". The above-mentioned "expression" may be a vocabulary word (such as "狗" and "dog"), a word group (such as "酒瓶" and "wine bottle"), or a simple sentence (such as "你好嗎?" and "How are you?").

Figure 4:
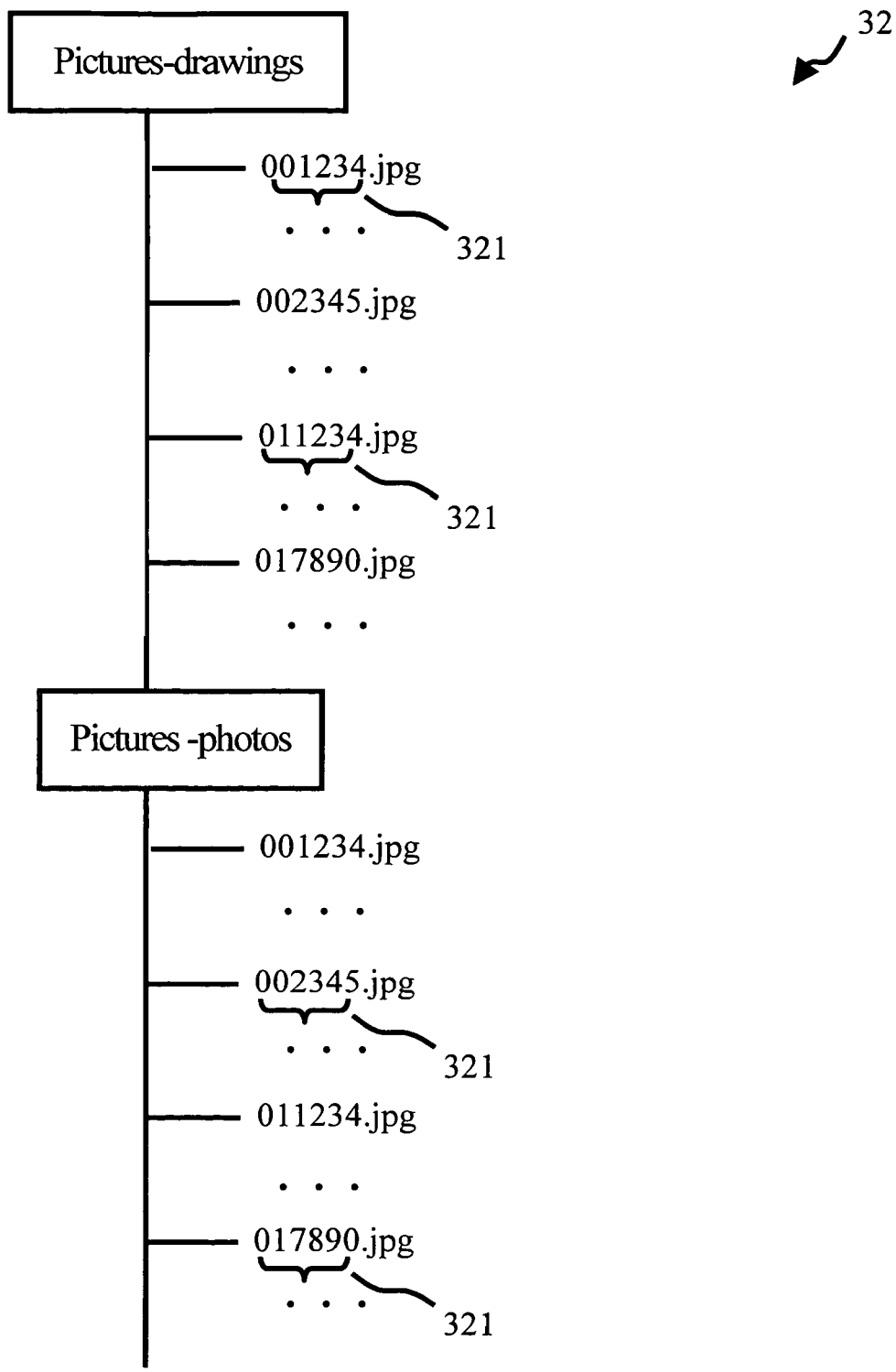
FIG. 4 shows an embodiment of a picture database according to the present invention.

Please refer to FIG. 4, which shows an embodiment of the picture database 32. The picture database 32 comprises a plurality of pictures. In this embodiment, the plurality of pictures are stored in the storage device 14 as picture files (i.e. JPG files), and a picture file name 321 of the picture file has the same correlation index as its corresponding expression. For example, the picture file name 321 of "001234.jpg" file is "001234", and the picture "001234.jpg" is the picture for "蘋果" and "Apple". Therefore, the user can find the corresponding "picture" for a related "expression".

Moreover, in this embodiment, there are two types of pictures: "drawing type" and "photo type". Pictures that belong to "drawing type" are stored in a "picture-drawing" folder, and pictures that belong to "photo type" are stored in a "picture-photo" folder. Please take notice of that the file "001234.jpg" under the "picture-drawing" folder shows a "drawing type" apple, and the file "001234.jpg" under the "picture-photo" folder shows a "photo type" apple. Furthermore, the picture file name 321 need not necessary be identical with the correlation index of the corresponding expression; for example, the corresponding picture file "001234.jpg" for "蘋果" could also be named "picture-001234.jpg", so that the correlation index "001234" can be still related to the related file "picture-001234.jpg". Of course, the corresponding picture file "001234.jpg" for "蘋果" can also be named "apple.jpg", or may even be provided a random name, such as "abcd.jpg", as long as there is a suitable index list stored in the database (i.e., an index list between the expressions and picture file names, not shown in the figure).

Besides, please take notice of that each expression ideally has a corresponding picture, some abstract expressions (e.g. "really?", "nanometer"), may have no corresponding picture.

Figure 5:
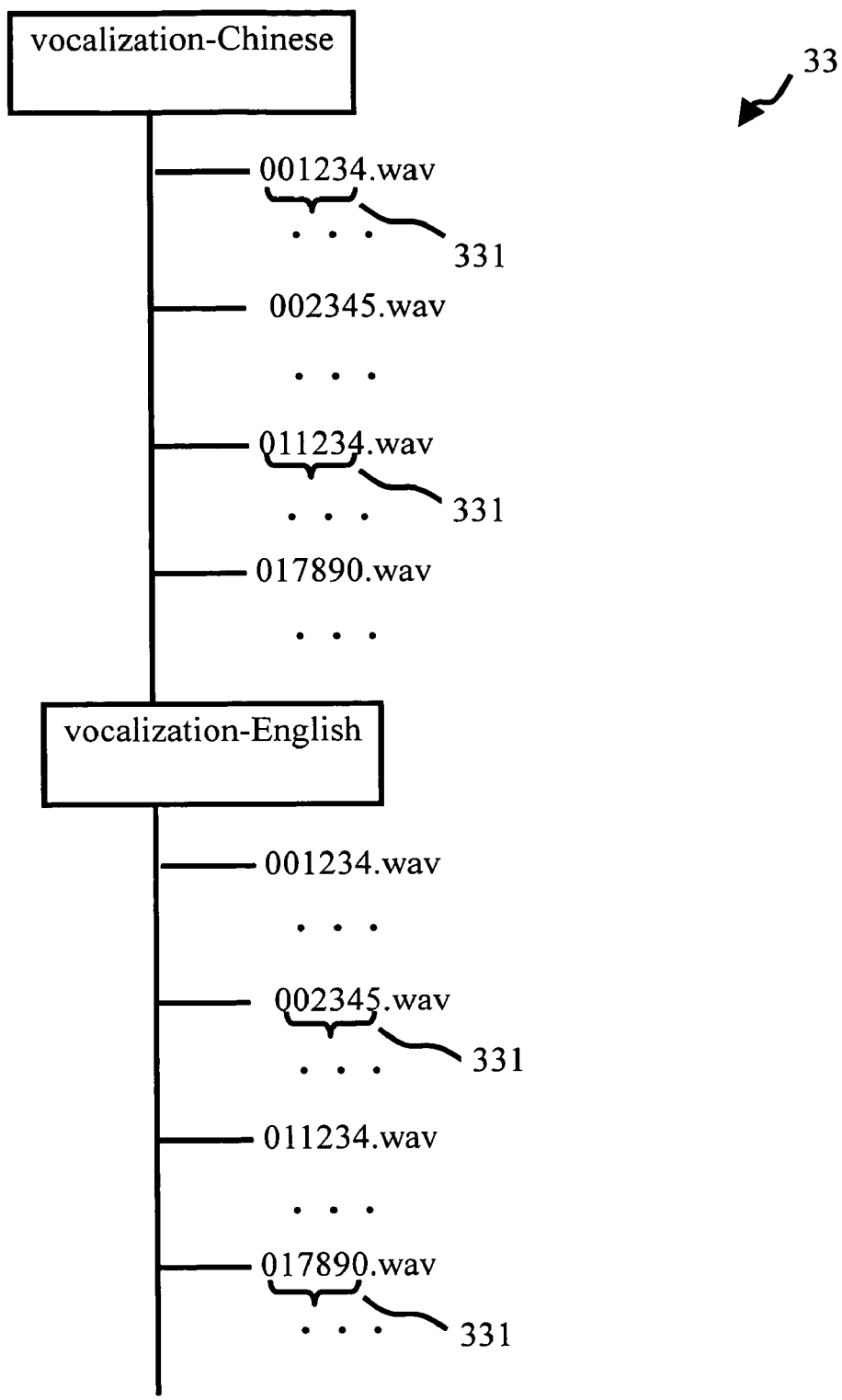
FIG. 5 shows an embodiment of a vocalization database according to the present invention.

Please refer to FIG. 5, which shows an embodiment of the vocalization database 33. The vocalization database 33 comprises a plurality of vocalizations for the expressions, and it utilizes a similar storage method and structure as the picture database 32. A vocalization file name 331 corresponds to a related "correlation index" of the expression; for example, the Chinese pronunciation of "蘋果" is stored in a "001234.wav" file in a "vocalization-Chinese" folder, and the English pronunciation of "Apple" is stored in a "001234.wav" file in a "vocalization-English" folder. If there are ten different languages, then there may be ten folders. Moreover, each language may have more than one vocalization; for example, there may be a Chinese "male vocalization" and "female vocalization" respectively stored in "male vocal vocalization-Chinese" and a "female vocal vocalization-Chinese" folders.

The search program 27 therefore utilizes the correlations between the text vocabularies, pictures, and vocalizations to perform searches for the related correlation indices.

Each expression ideally has a corresponding vocalization, but some expressions in some languages may have no related vocalization, or one expression may correspond to two or more vocalizations (feminine or masculine). Consequently, it will be appreciated that expressions and related vocalizations do not necessary have a one to one relationship.

Figure 10:
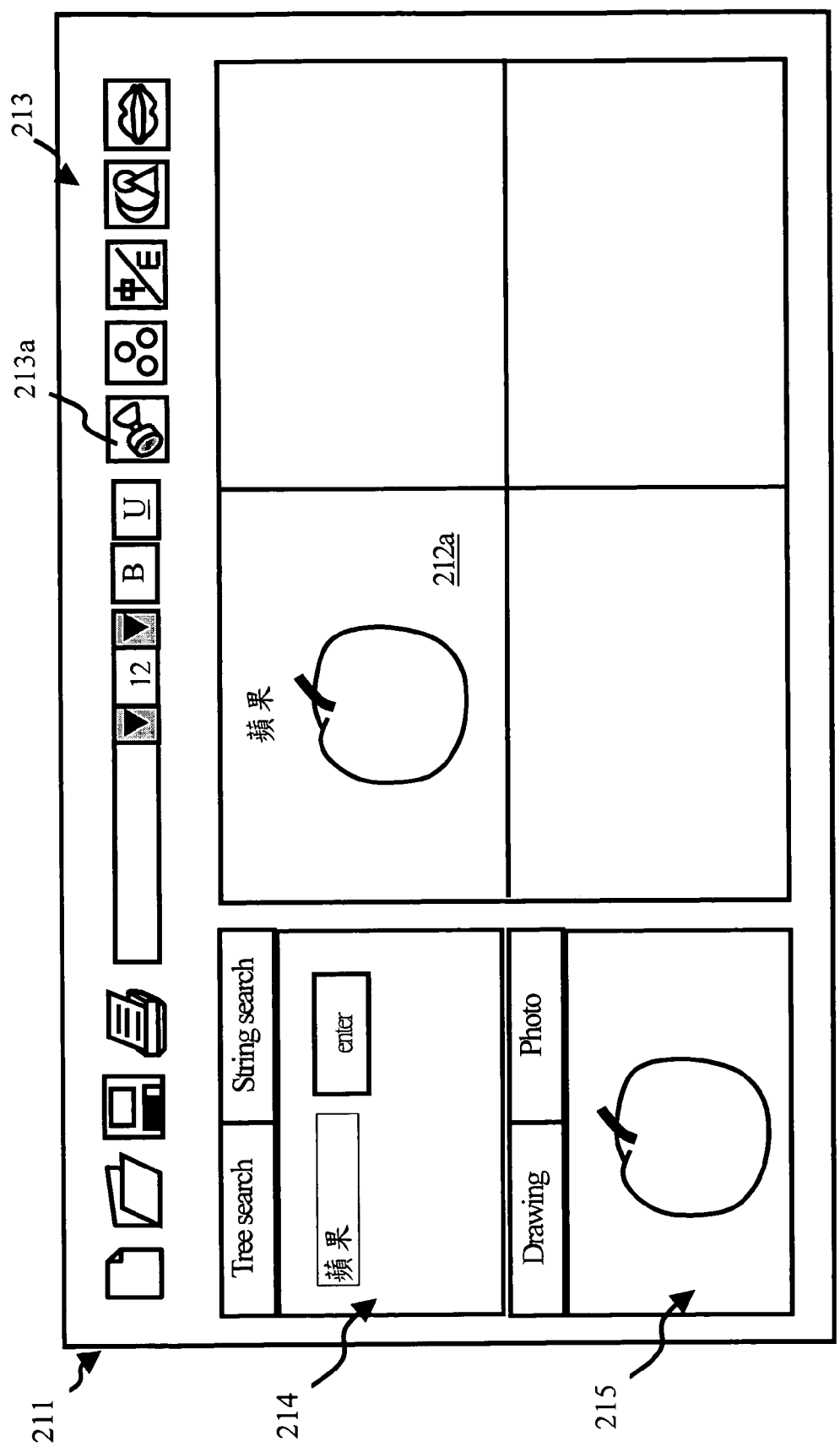

Step 203:

Using the picture insertion program 24 to paste a picture into the language communication unit:

Please refer to FIG. 10, which shows insertion of the picture for "蘋果" into the language communication unit 212a. Various methods may be used to achieve step 203. For example, the mouse may be used to drag the picture of "蘋果" in the picture display area 215 to the language communication unit 212a (not shown); or, by clicking on the right key of the mouse and than selecting a "paste" function from a pop up menu (not shown); or by pressing a paste button 213a, and then moving in the language communication unit 212a and pressing on the left key of the mouse. Since the pasting of pictures is a well-known technology, it requires no further description.

Furthermore, in this embodiment, an expression may also be pasted into the language communication unit. For example, the Chinese expression "蘋果" is also pasted into the language communication unit 212a, which is executed by the expression insertion program 23.

Figure 11:
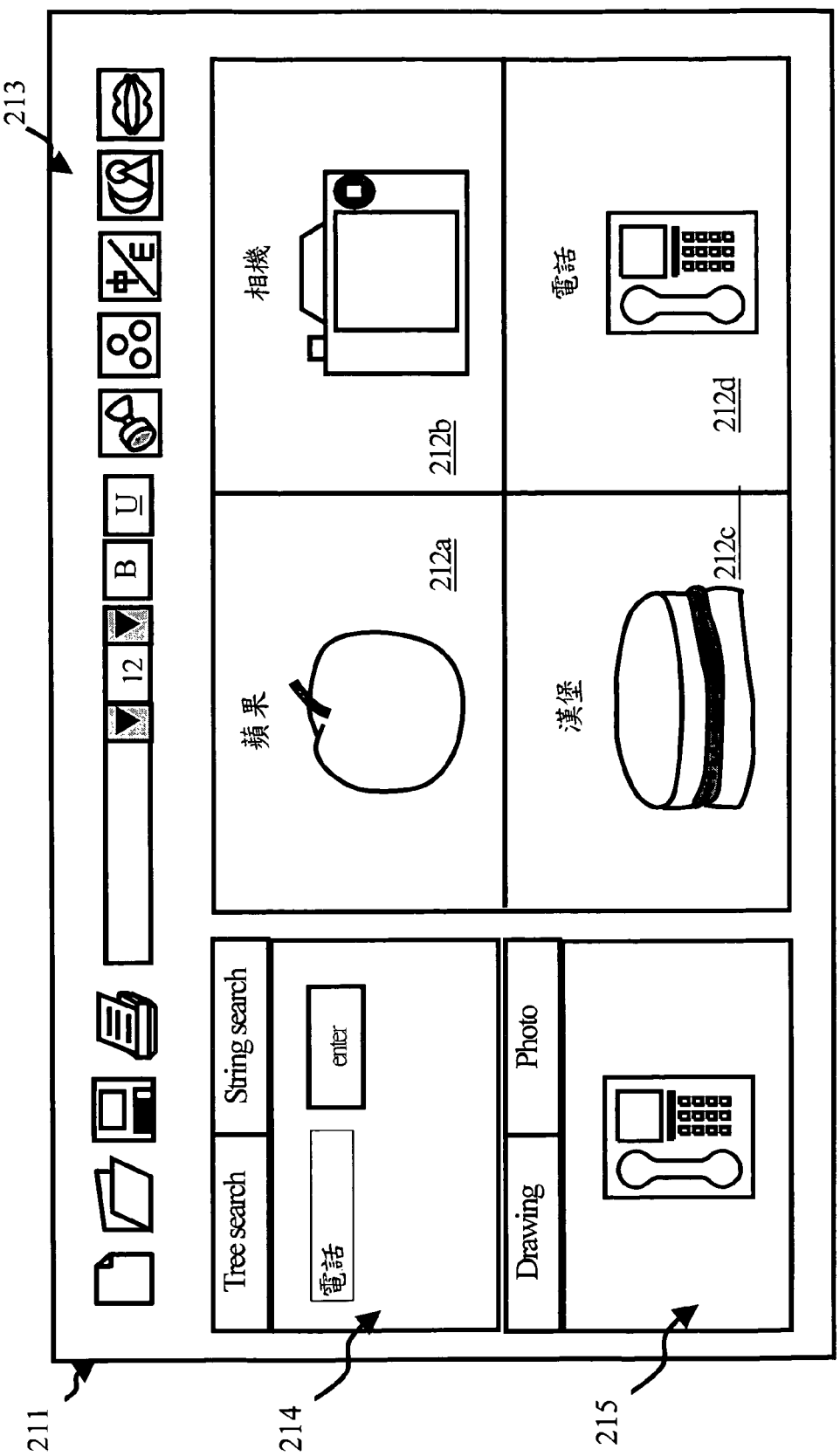

As shown in FIG. 11, four language communication units 212a, 212b, 212c, 212d all have pictures and expressions that have been inserted.

Figure 12:
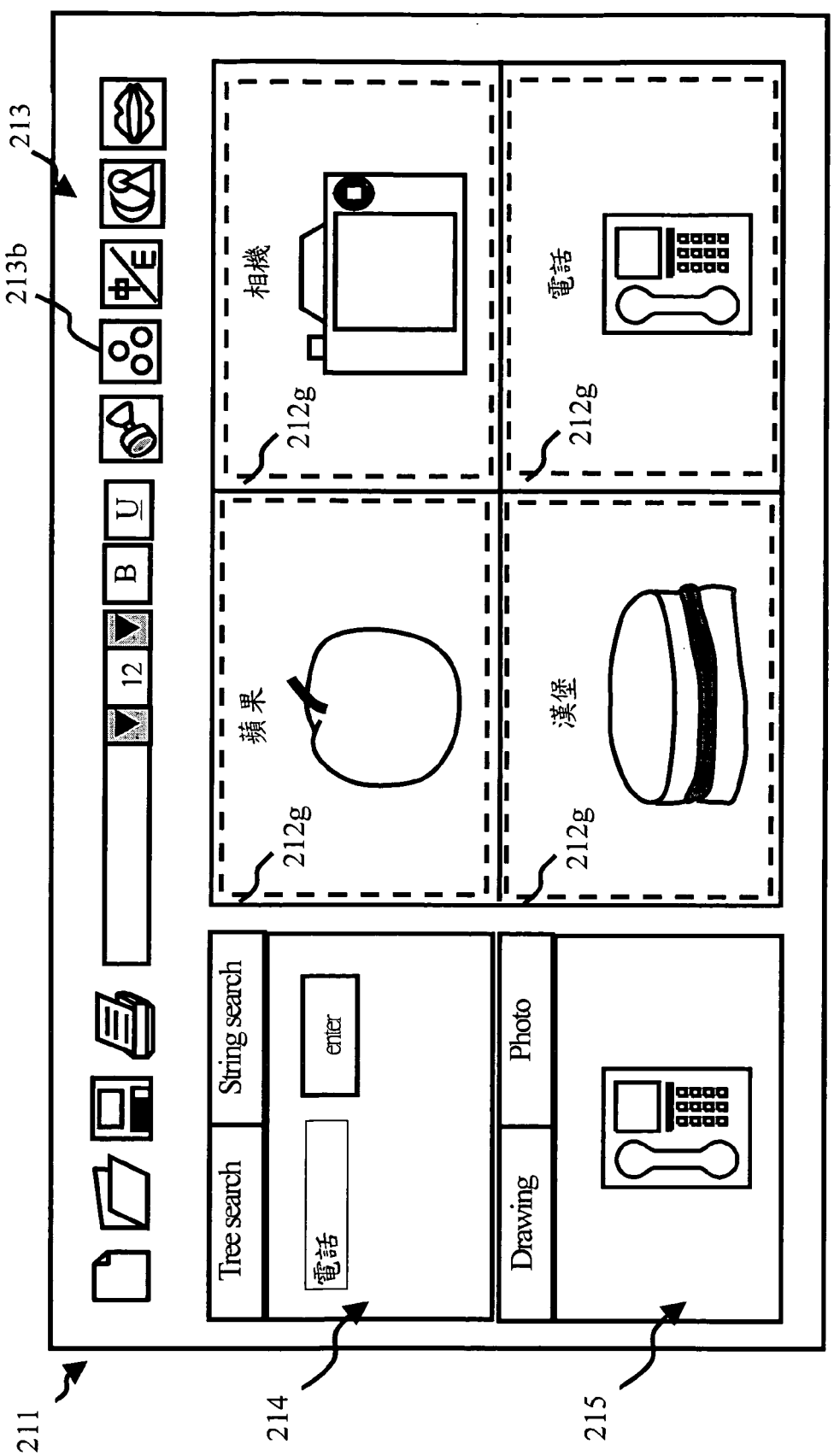

Step 204:

Using the language assigning program 25 to change the language of the expression:

If the user wants to change all "Chinese expressions" in the language communication units 212a, 212b, 212c, 212d to "English expressions", in this embodiment, the uses may press a "select all" button 213b. With reference to FIG. 12, dashed line 212g surrounds all the language communication units 212a, 212b, 212c, 212d.

Figure 13:
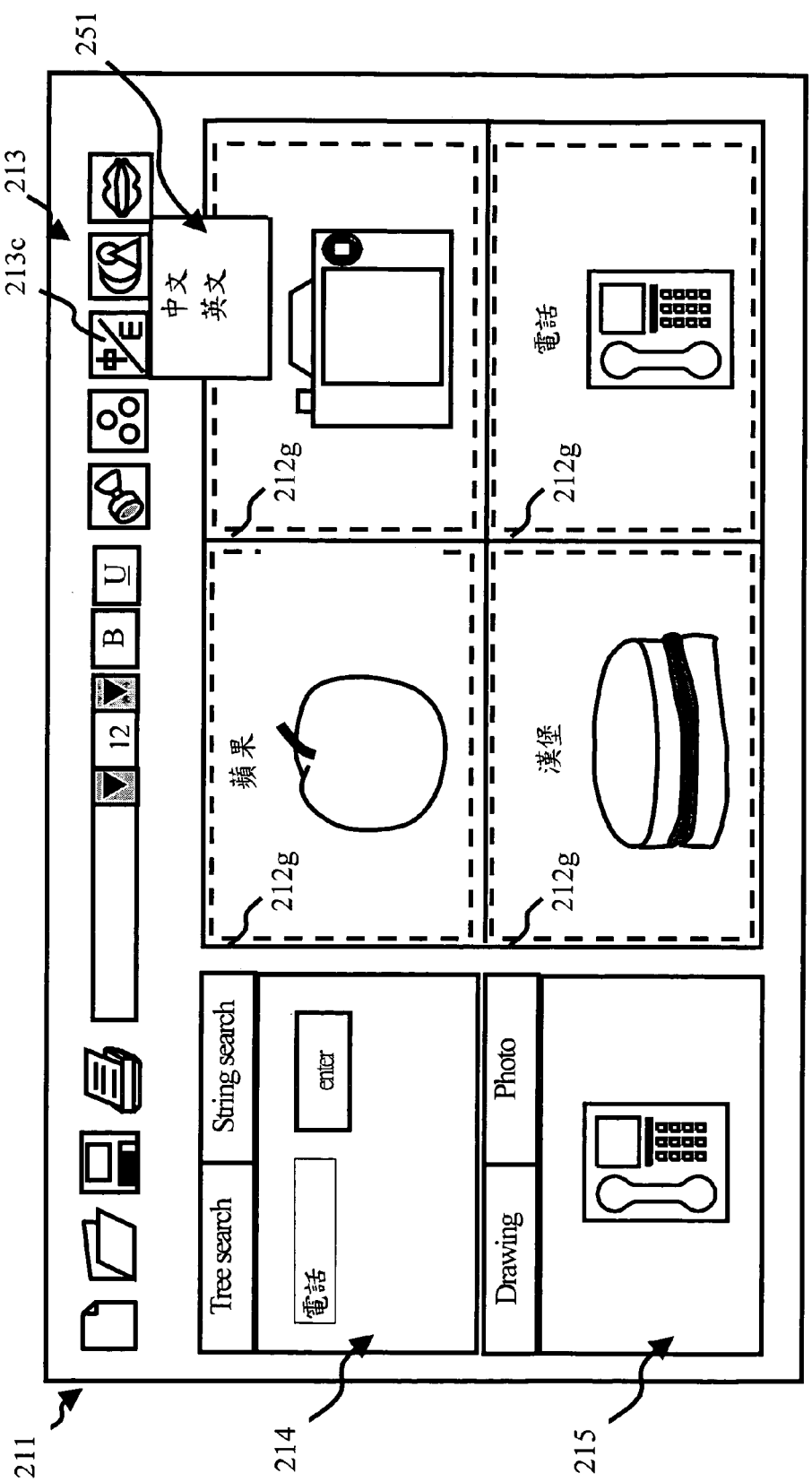
Figure 14:
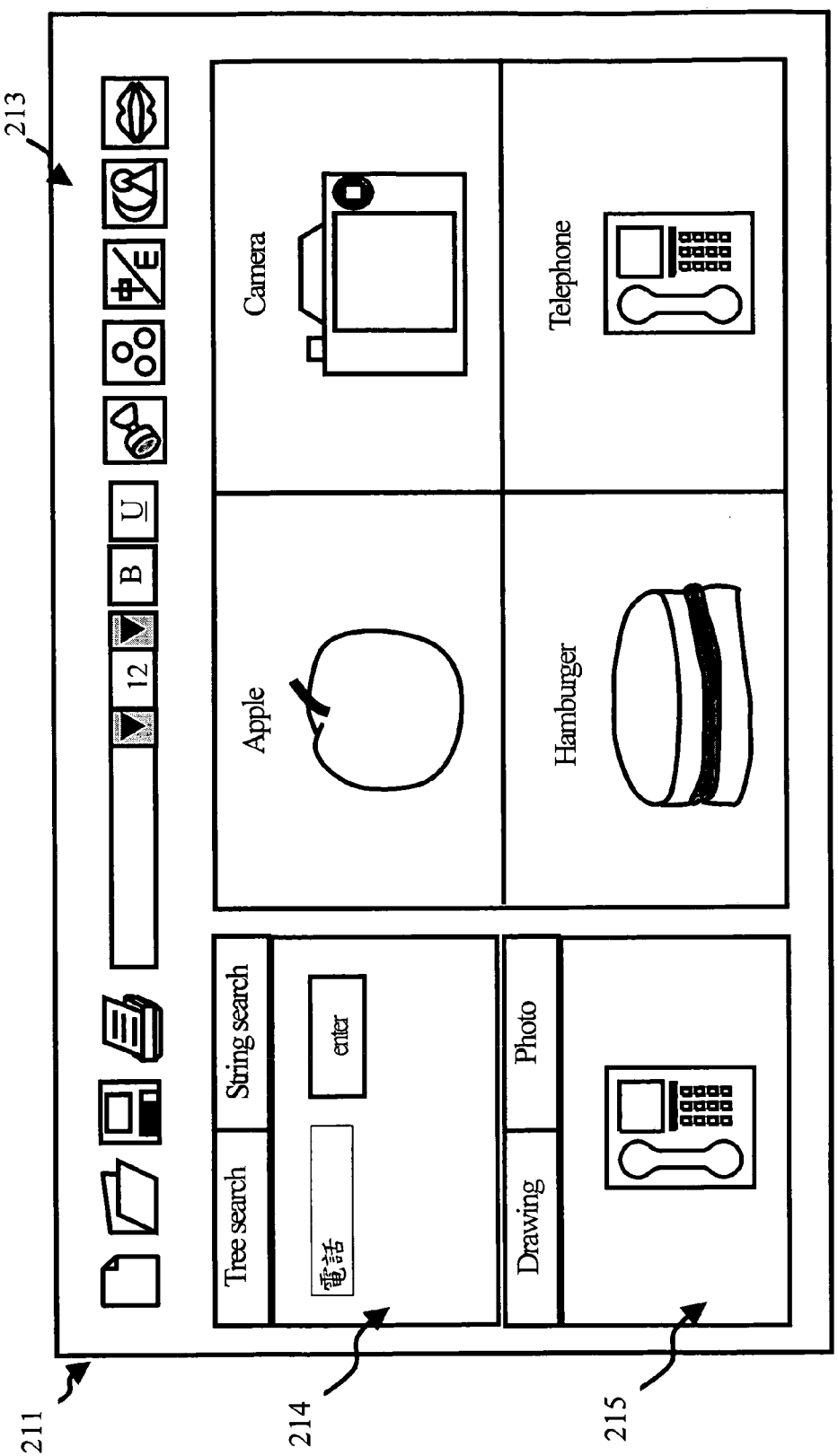
Figure 15:
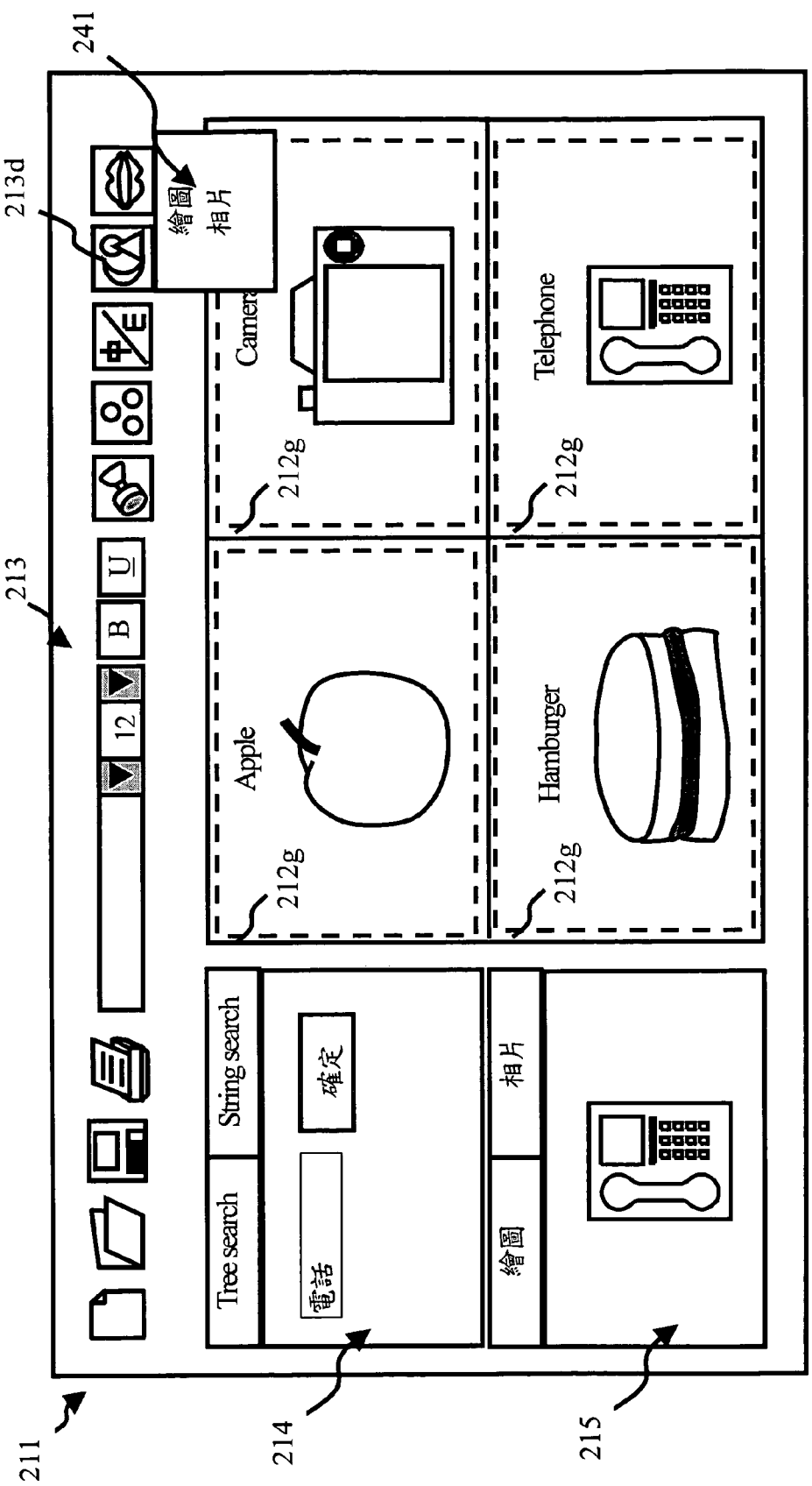
Figure 16:
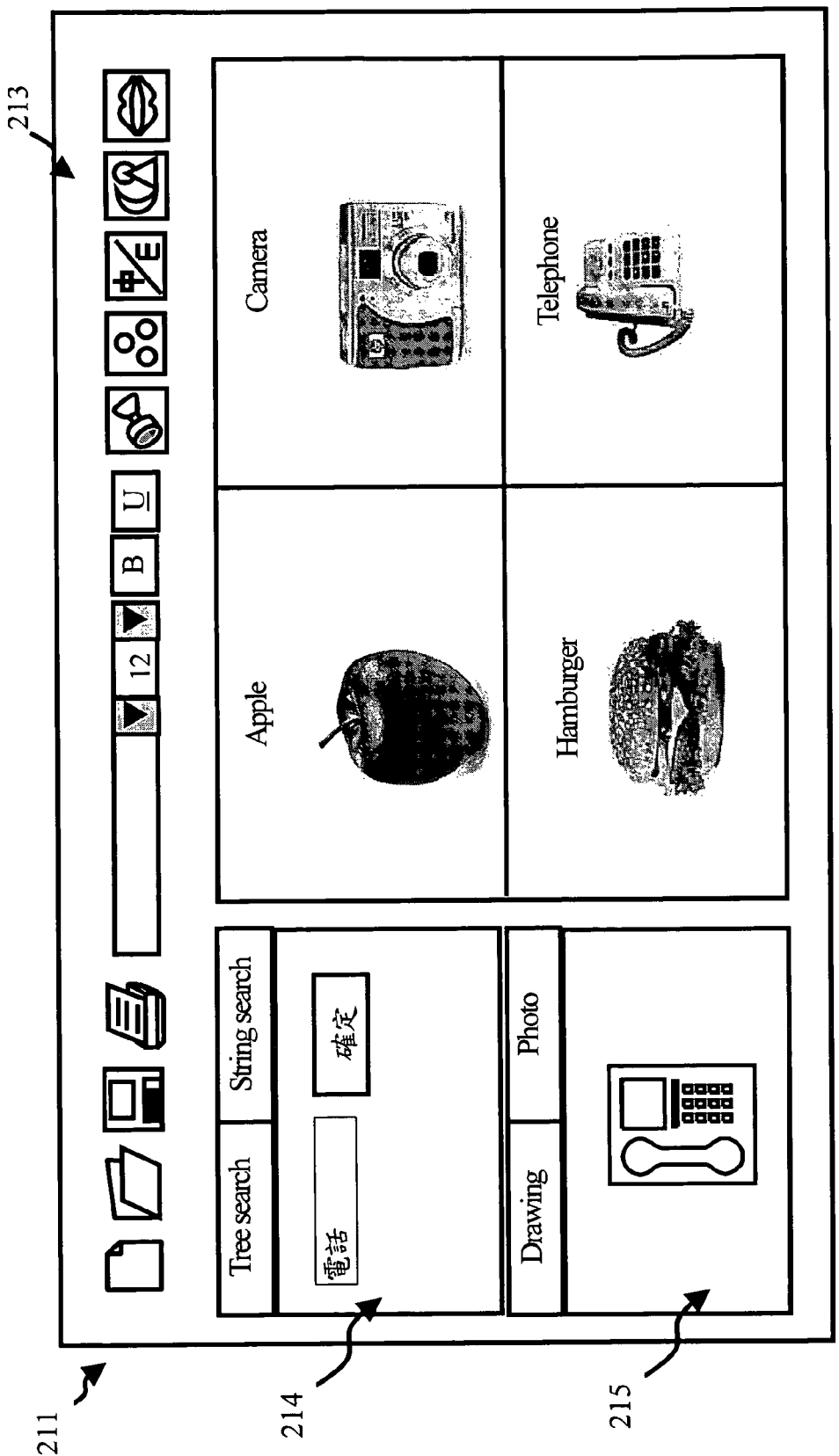
Figure 17:
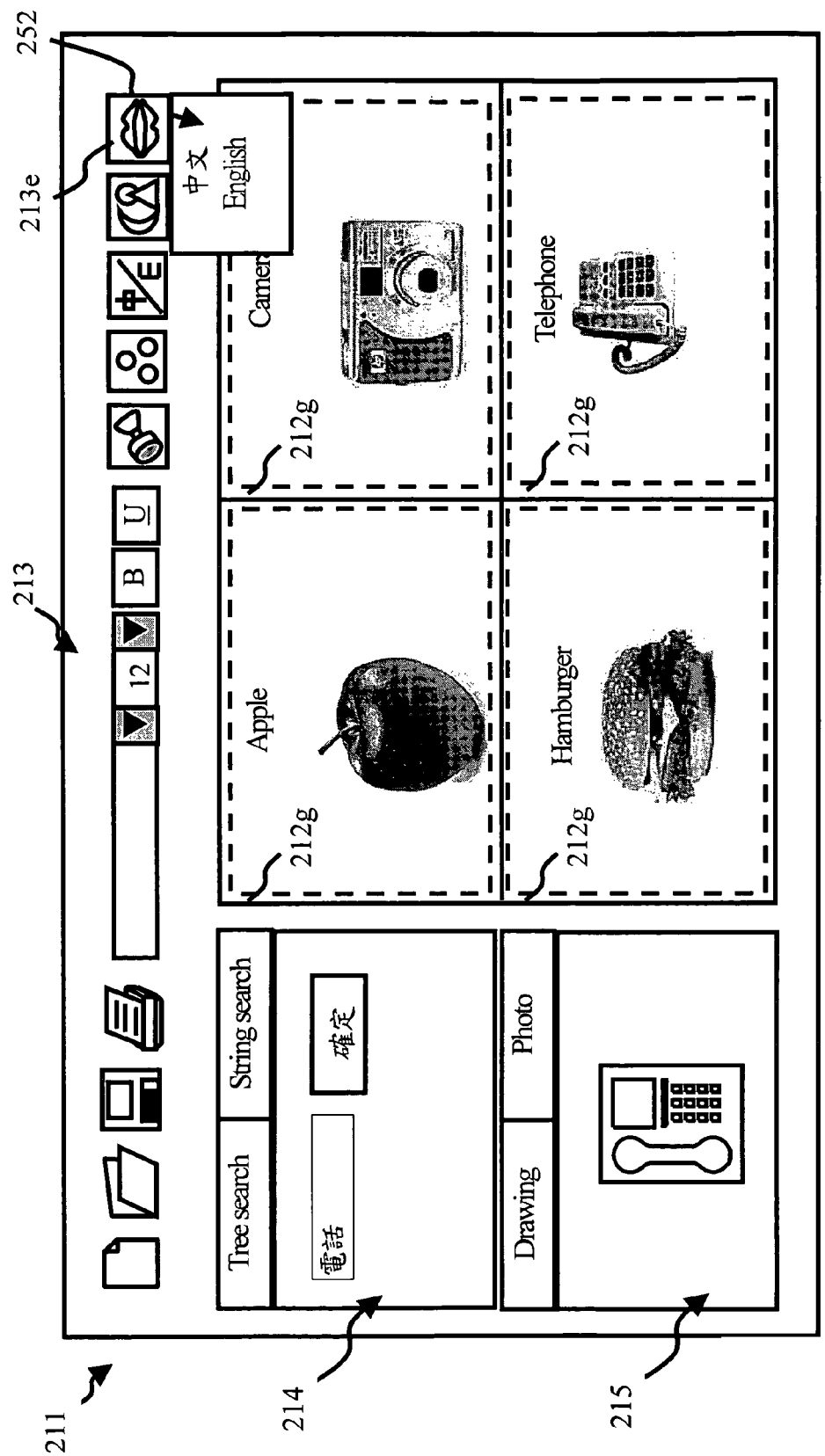

With reference to FIG. 13, the user next presses the language operating button 213c, and a language assigning window 251 pops up which shows two buttons: "Chinese" and "English". If the user selects "English", with reference to FIG. 14, all "Chinese expressions" are changed into their related "English expressions".

Step 205:

Changing the type for the pictures:

The user may also change the type of the pictures. After selecting the "select all" button 213b (with reference to FIG. 12), the user can select a type selection button 213d, and a picture type selection window 241 pops up (with reference to FIG. 15); the picture type selection window 241 displays two buttons: "drawing" and "photo". For example, if the user selects the "photo", and with reference to FIG. 16, all "drawing type" pictures are changed to "photo type" pictures.

Step 206:

Utilizing the language assigning program 25 to change the vocalization language:

Similarly, the user can change the language used for the vocalizations. After selecting the "select all" button 213b (referred to in FIG. 12), and with reference to FIG. 17, when the user selects a vocalization button 213e, a language assigning window 252 pops up. The language assigning window 252 displays the two buttons: "Chinese" and "English"; if, for example, the user selects "English", the completed "language communication sheet" 50 (with reference to FIG. 18) may have English vocalizations.

Step 207:

Generating an output file 261 with the output file generating program 26 (with reference to FIG. 6):

In the "language communication sheet" 50 (please refer to FIG. 18), the output file 261 comprises the position of each language communication unit (for example, the language communication unit 212a may be recorded as Cell-1, and the language communication unit 212a may have a coordinate of 0, 0 at its left upper corner and a coordinate of 10, 10 at its right lower corner); the expression (such as "apple") inserted in each language communication unit; the picture (such as the file 001234.jpg under the "picture-photo" folder) inserted in each language communication unit, and the vocalization (such as the file 001234.wav file under the "vocalization-English" folder) corresponding to the inserted expression in each language communication unit. The output file 261 may be updated during the entire editing process.

Figure 18:
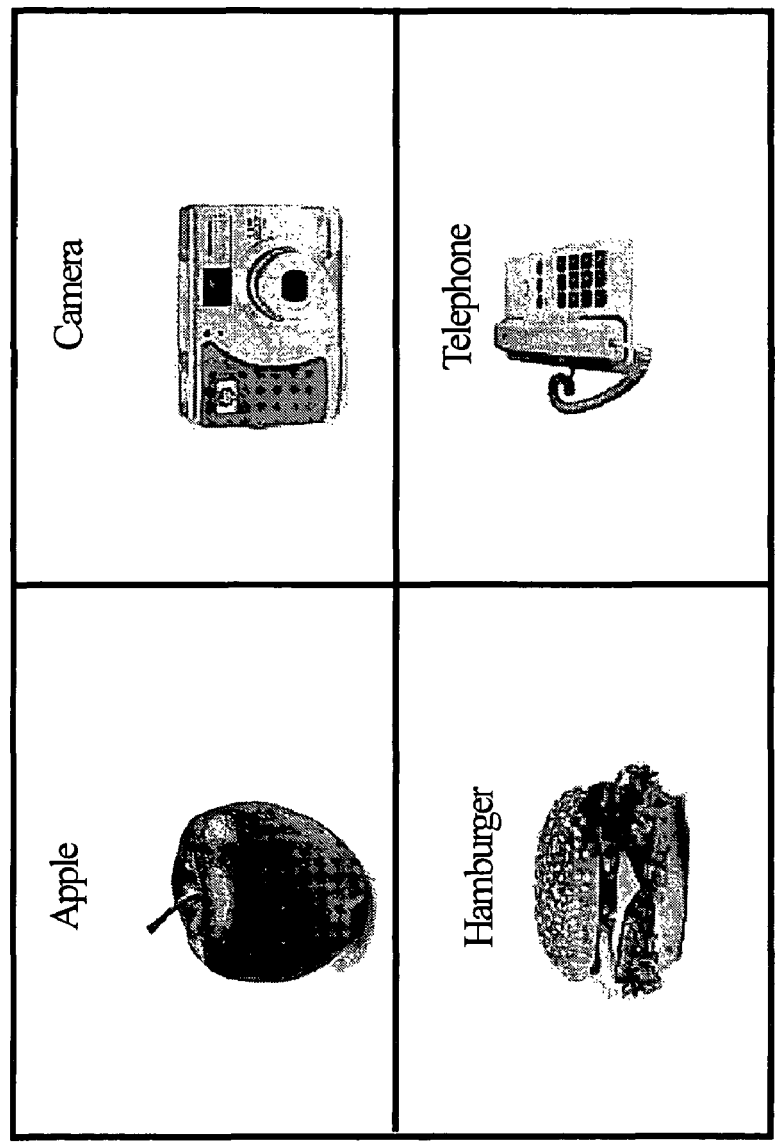
FIG. 18 shows a completed language communication sheet.

Please refer to FIG. 18. By utilizing a viewing program (not shown) to read the output file 261, the "language communication sheet" 50 can be presented; for example, when the user clicks on "Apple", the vocalization for "Apple" may be performed.

Although the present invention has been explained in relation to its preferred embodiment, it is to be understood that many other possible modifications and variations can be made without departing from the spirit and scope of the invention as hereinafter claimed.

What is claimed is:

1. A method of editing a language communication sheet comprising:

providing a picture/text editing interface, wherein the picture/text editing interface has a picture/text editing area and a function key area;

providing a dividing function for a communication sheet to divide the picture/text editing area into a plurality of language communication units;

providing an expression database, the expression database comprising a plurality of expressions, wherein the expressions comprising expressions in the first language and expressions in the second language, and two expressions individually from the first language and the second language having substantially identical meanings are correlated, the expression database comprises a plurality of correlation indices, each correlation index correlating an expression having a substantially identical meaning in the first language and the second language with identical meaning have a same correlation index so that the two vocalizations individually in the first language and the second language with substantially identical meanings are correlated;

providing a picture database, the picture database comprising a plurality of pictures, wherein at least one of the pictures is correlated with one expression of the expression database, each picture comprises a picture file name, and each picture file name corresponds to one correlation index so that a correlation is provided between the picture and an expression; and providing a vocalization database, the vocalization database comprising a plurality of vocalizations corresponding to the plurality of expressions, wherein the vocalizations comprise vocalizations in the first language and vocalizations in the second language, and two vocalizations individually from the first language and the second language having identical meanings are correlated, wherein at least one of the vocalizations is correlated with one expression of the expression database, each vocalization comprises a vocalization file name, and the vocalization file name corresponds to one correlation index so that a correlation is provided between the vocalization and an expression;

providing a correlation searching function, wherein the correlation searching function performs at least one of the following functions:
  finding a corresponding picture for an expression according to the correlations between the expressions and the pictures; and
  finding a corresponding vocalization for an expression according to the correlations between the expressions and the vocalization;
providing an expression insertion function inserting an expression into any one of the language communication units;
providing a picture insertion function inserting a picture into any one of the language communication units; and
providing a language assigning function, wherein the language assigning function assigns expressions in all language communication units as expressions in the first language or as expressions in the second language in one operation.

2. The method as claimed in claim 1, wherein the picture/text editing interface further comprises a picture searching area, and the picture searching area inputs an expression and then finds a corresponding picture for the input expression according to the correlations between the expressions and the pictures.

3. The method as claimed in claim 1 further comprising the following steps:
  providing an output file generation function to generate an output file, wherein the output file comprises:
    a position of each language communication unit;
    an expression inserted into each language communication unit;
    a picture inserted into each language communication unit; and
    a vocalization corresponding to the expression inserted into each language communication unit.

4. The method as claimed in claim 1, wherein the language assigning function assigns all vocalizations of expressions in all language communication units as vocalizations of the first language or vocalizations of the second language in one operation.

5. The method as claimed in claim 1, wherein the pictures include pictures of a first type and pictures of a second type, and the method further provides a picture format type assigning function for assigning all pictures in all language communication units as pictures of the first type or pictures of the second type in one operation.

6. A system of editing language communication sheets comprising a processor, a memory, a screen, a storage device and an input device, wherein:
  the storage device comprises:
    an expression database, the expression database comprising a plurality of expressions, wherein the expressions comprising expressions in the first language and expressions in the second language, and two expressions individually from the first language and the second language having substantially identical meanings are correlated, the expression database comprises a plurality of correlation indices, each correlation index correlating an expression having a substantially identical meaning in the first language and the second language with identical meaning have a same correlation index so that two vocalizations individually in the first language and the second language with substantially identical meanings are correlated;
    a picture database, the picture database comprising a plurality of pictures, wherein at least one of the pictures is correlated with one expression of the expression database, each picture comprises a picture file name, and each picture file name corresponds to a correlation index to provide a correlation between the picture and an expression; and
    a vocalization database, the vocalization database comprising a plurality of vocalizations corresponding to the plurality of expressions, wherein the vocalizations comprise vocalizations in the first language and vocalizations in the second language, and two vocalizations individually from the first language and the second language having substantially identical meanings are correlated, wherein at least one of the vocalizations is correlated with one expression of the expression database, each vocalization comprises a vocalization file name, each vocalization file name corresponding to a correlation index so that a correlation is provided between the vocalization and an expression;
  the memory comprises a software program executable by the processor to achieve the following functions:
    providing a picture/text editing interface, wherein the picture/text editing interface has a picture/text editing area and a function key area;
    providing a dividing function for a communication sheet to divide the picture/text editing area into a plurality of language communication units;
    providing a correlation searching function, wherein the correlation searching function performs at least one of the following functions:
      finding a corresponding picture for an expression according to the correlations between the expressions and the pictures; and
      finding a corresponding vocalization for an expression according to the correlations between the expressions and the vocalization;
    providing an expression insertion function inserting an expression into any one of the language communication units;
    providing a picture insertion function capable of inserting a picture into any one of the language communication units; and
    providing a language assigning function, wherein the language assigning function assigns expressions in all language communication units as expressions in the first language or as expressions in the second language in one operation.

7. The system as claimed in claim 6, wherein the picture/text editing interface further comprises a picture search area, and the picture search area inputs an expression and then finds a corresponding picture for the input expression according to the correlations between the expressions and the pictures.

8. The system as claimed in claim 6 wherein the software program further comprises the following means:
  providing an output file generation function to generate an output file, wherein the output file comprises:
    a position of each language communication unit;
    an expression inserted into each language communication unit;
    a picture inserted into each language communication unit; and
    a vocalization corresponding to the expression inserted into each language communication unit.

9. The system as claimed in claim 6, wherein the language assigning function assigns all vocalizations of expressions in all language communication units as vocalizations in the first language or vocalizations in the second language in one operation.

10. The system as claimed in claim 6, wherein the pictures include pictures of a first type and pictures of a second type, and the software program further provides a picture format type assigning means for assigning all pictures in all language communication units as pictures of the first type or pictures of the second type in one operation.

11. A computer readable object enabling a user to use a computer to edit a language communication sheet, wherein the computer readable object comprises a medium for recording program code, the medium comprising the following program code:
   a picture/text editing program for providing a picture/text editing interface, wherein the picture/text editing interface has a picture/text editing area and a function key area;
   a communication sheet dividing program for dividing the picture/text editing area into a plurality of language communication units;
      an expression database, the expression database comprising a plurality of expressions, wherein the expressions comprise expressions in the first language and expressions in the second language, and two expressions individually in the first language and the second language having substantially identical meanings are correlated, the expression database comprises a plurality of correlation indices, each correlation index correlating an expression having a substantially identical meaning in the first language and the second language with identical meaning have a same correlation index so that two vocalizations individually in the first language and the second language with substantially identical meanings are correlated;
   a picture database, the picture database comprising a plurality of pictures, wherein at least one of the pictures is correlated with one expression of the expression database, each picture comprises a picture file name, and picture file name corresponds to a correlation index so that a correlation is provided between the picture and an expression;
   a vocalization database, the vocalization database comprising a plurality of vocalizations corresponding to the plurality of expressions, wherein the vocalizations comprise vocalizations in the first language and vocalizations in the second language, and two vocalizations individually from the first language and the second language having substantially identical meanings are correlated, wherein at least one of the vocalizations is correlated with one expression of the expression database, each vocalization comprises a vocalization file name, and the vocalization file name corresponds to a correlation index so that a correlation is provided between the vocalization and an expression;
   a search program, wherein the search program performs at least one of the following functions:
      finding a corresponding picture for an expression according to the correlations between the expressions and the pictures; and
      finding a corresponding vocalization for an expression according to the correlations between the expressions and the vocalizations;
   an expression insertion program for inserting an expression into any one of the language communication units;
   a picture insertion program for inserting a picture into any one of the language communication units; and
   a language assigning program for assigning expressions in all language communication units as expressions in the first language or as expressions in the second language in one operation.

12. The computer readable object as claimed in claim 11, wherein the picture/text editing interface further comprises a picture searching area, and the picture search area inputs an expression and then finds a corresponding picture for the input expression according to the correlations between the expressions and the pictures.

13. The computer readable object as claimed in claim 11 further comprising an output file generation program for generating an output file, wherein the output file comprises:
   a position of each language communication unit;
   an expression inserted into each language communication unit;
   a picture inserted into each language communication unit; and
   a vocalization corresponding to the expression inserted into each language communication unit.

14. The computer readable object as claimed in claim 11, wherein the language assigning function assigns all vocalizations of expressions in all language communication units as vocalizations in the first language or as vocalizations in the second language in one operation.

15. The computer readable object as claimed in claim 11, wherein the pictures includes pictures of a first type and pictures of a second type, and the program code further provides a picture format type assigning function for assigning all pictures in all language communication units as pictures of the first type or as pictures of the second type in one operation.

* * * * *